United States Patent
Soyel et al.

(10) Patent No.: US 11,263,471 B2
(45) Date of Patent: Mar. 1, 2022

(54) IMAGE PROCESSING METHOD, APPARATUS AND COMPUTER PROGRAM

(71) Applicant: Queen Mary University of London, London (GB)

(72) Inventors: Hamit Soyel, London (GB); Peter McOwan, London (GB)

(73) Assignee: Queen Mary University of London, London (GB)

( * ) Notice: Subject to any disclaimer, the term of this patent is extended or adjusted under 35 U.S.C. 154(b) by 276 days.

(21) Appl. No.: 16/482,692

(22) PCT Filed: Jan. 29, 2018

(86) PCT No.: PCT/GB2018/050246
§ 371 (c)(1),
(2) Date: Jul. 31, 2019

(87) PCT Pub. No.: WO2018/142110
PCT Pub. Date: Aug. 9, 2018

(65) Prior Publication Data
US 2021/0303906 A1 Sep. 30, 2021

(30) Foreign Application Priority Data
Feb. 6, 2017 (GB) .................................. 1701919

(51) Int. Cl.
*G06K 9/00* (2006.01)
*G06K 9/46* (2006.01)
*G06T 5/00* (2006.01)

(52) U.S. Cl.
CPC ......... *G06K 9/4671* (2013.01); *G06K 9/4652* (2013.01); *G06K 9/4661* (2013.01); *G06T 5/002* (2013.01)

(58) Field of Classification Search
CPC .. G06K 9/4671; G06K 9/4661; G06K 9/4652; G06K 9/4628; G06K 9/0061;
(Continued)

(56) References Cited

U.S. PATENT DOCUMENTS

2006/0215922 A1 9/2006 Koch et al.
2017/0039436 A1* 2/2017 Chen .................... G06K 9/4628
(Continued)

FOREIGN PATENT DOCUMENTS

GB 2 512 720 A 10/2014
JP 2016-161417 A 9/2016

OTHER PUBLICATIONS

Achanta, et al., "Frequency-tuned Salient Region Detection", 2009 IEEE Conference on Computer Vision and Pattern Recognition: CVPR 2009; Miami, Florida, USA, Jun. 20-25, 2009, IEEE, Piscataway, NJ, Jun. 20, 2009, pp. 1597-1604.
(Continued)

*Primary Examiner* — Jose L Couso
(74) *Attorney, Agent, or Firm* — Foley & Lardner LLP (57) ABSTRACT

The present invention provides a novel algorithm for salience detection based on a dual rail antagonistic structure to predict where people look in images in a free-viewing condition. Furthermore, the proposed algorithm can be effectively applied to both still and moving images in visual media without any parameter tuning in real-time.

15 Claims, 6 Drawing Sheets

(58) Field of Classification Search
CPC ............. G06K 9/0014; G06K 9/00617; G06K 9/4604; G06K 9/00624; G06K 9/00677; G06K 9/56; G06K 9/6427; G06K 9/6201; G06K 9/6256; G06K 9/6257; G06K 9/6262; G06K 9/6263; G06K 9/6271; G06K 9/628; G06K 9/3233; G06K 9/46; G06K 9/6202; G06K 9/6215; G06K 9/6255; G06K 9/6261; G06K 9/6276; G06K 9/629; G06K 9/3241; G06K 9/00201; G06K 9/00798; G06K 2209/05; G06K 2009/4666; G06T 5/002; G06T 5/50; G06T 3/40; G06T 3/0068; G06T 7/12; G06T 7/0012; G06T 7/30; G06T 7/0014; G06T 7/11; G06T 7/248; G06T 7/90; G06T 7/00; G06T 7/20; G06T 7/40; G06T 7/174; G06T 7/33; G06T 7/44; G06T 11/00; G06T 2207/10016; G06T 2207/10072; G06T 2207/20221; G06T 2207/10024; G06T 2207/20081; G06T 2207/20084; A61B 6/4417; A61B 6/5217; A61B 6/5235; A61B 6/5229; A61B 5/7267; G09G 2320/0271; G09G 2320/066; G09G 2320/0276; G09G 2320/0673; G09G 2340/10; G09G 2380/08; G09G 5/028; G09G 5/14; G16H 50/30; G16H 30/20; G16H 30/40; G06F 16/5838; G06N 3/02; G06N 3/08–088; G06N 20/00

See application file for complete search history.

(56) References Cited

U.S. PATENT DOCUMENTS

| 2017/0124409 A1* | 5/2017 | Choi | G06N 3/0454 |
| 2017/0140236 A1* | 5/2017 | Price | G06K 9/3241 |

OTHER PUBLICATIONS

Akbari, et al., "Adaptive Saliency-Based Compressive Sensing Image Reconstruction", 2016 IEEE International Conference on Multimedia & Expo Workshops (ICMEW), IEEE, Jul. 11, 2016, pp. 1-6.

Gupta, et al., "Psychovisual Saliency in Color Images", 2013 Fourth National Conference on Computer vision, Pattern Recognition, Image Processing and Graphics (NCVPRIPG), IEEE, Dec. 18, 2013, pp. 1-4.

Information Resources Management Association (IRMA): "Image Processing: Concepts, Methodologies, Tools, and Applications", May 31, 2013, IGI Global, XP002779367.

International Search Report dated Apr. 3, 2018, for application No. PCT/GB2018/050246.

Katramados, et al., "Real-Time Visual Saliency By Division of Gaussians", Image Processing (ICIP), 2011 18th IEEE International Conference on Image Processing, Sep. 11, 2011, pp. 1701-1704.

Poynton, Charles A., "Digital Video and HDTV: Algorithms and Interfaces", Jan. 1, 2003, Morgan Kaufmann, XP002779366.

Schachter, Bruce, "Biological models for automatic target detection", SPIE, vol. 6967, No. 69670Y, Apr. 14, 2008.

Yu, et al., "Automatic Interesting Object Extraction From Images Using Complementary Saliency Maps", Proceedings of the ACM Multimedia 2010 International Conference: ACM MM'10 & Co-Located Workshops; Oct. 25-29, Firenze, Italy, Jan. 1, 2010, p. 891-894.

* cited by examiner

IMAGE PROCESSING METHOD, APPARATUS AND COMPUTER PROGRAM

The present invention relates to image processing and in particular to methods, apparatus and computer programs for automatically identifying regions of interest in an image or scene.

It is known that a human observer of an image or scene does not devote equal attention to all parts of the visible scene or image but rather certain features will catch the eye more than others. In various fields it is desirable to know what features in an image or scene will attract the user's attention most. For example, when designing a user interface (e.g. a GUI for a computer system, a control panel for a machine or a dashboard for a vehicle) it is important to ensure that the most important information or status indicators come first to the user's attention. Another example is signage, e.g. in buildings where it is desirable that emergency exit notices stand out or in transportation where signs and signals need to be easily identified and interpreted without undue distraction to drivers.

A known approach to identifying the areas in an image or scene that will attract attention is to have test subjects view the image or scene whilst being monitored by an eye tracking device. The eye tracking device observes the eyes of the test subject and works out where he or she is looking. This approach is time consuming, especially as it is necessary to use many test subjects to obtain an unbiased result.

According to the invention, there is provided a method of processing an image to identify conspicuous regions thereof, the method comprising:

receiving an input image;

deriving first and second antagonistic images from the input image; and obtaining a conspicuity map based on the first and second antagonistic images.

Embodiments of the present invention can therefore provide an automatic and objective determination of which parts of an image or scene will attract the attention of an observer. The use of two antagonistic images improves the accuracy of the results. For the purpose of the present invention, antagonistic images are images that encode data from one channel but with opposite senses. In one of a pair of antagonistic images a high channel value is encoded as a high signal value whilst in the other of the pair a high channel value is encoded as a low signal value. In the case of a luminance channel, one of the pair of antagonistic images may be the original image and the other an inverted image. In the case of color channels, the pair of antagonistic images may be different color difference signals.

The use of antagonistic images can be considered as analogous to the human visual system which encodes information from the eye photoreceptors in the form of ON-center and OFF-center pathways projecting to central visual structures from the retina. These two pathways originate at the bipolar cell level: one class of bipolar cells becomes hyperpolarized in response to light, as do all photoreceptor cells, and the other class becomes depolarized on exposure to light, thereby inverting the receptor signal; it is the difference between these pathways that is further processed. This antagonistic encoding can also be found in color perception where it is the balance between two separate channels that is encoded rather than just a single signal. For example the differences in, red versus green and blue versus yellow.

In the primary visual cortex, different cells detect features such as color, luminance, orientation and motion depending on the selectivity of their receptive fields. An embodiment of the invention can employ five feature channels which analyze the input image: one luminance channel, two color channels, one for orientation and one motion channel. Input images are transformed employing the antagonistic approach into positive and negative features in each of the five channels, again using the two measures, the direct and inverse signals to extract the sensory conspicuity features of the feature channels individually.

In an embodiment if the invention, the antagonistic feature channels are combined to generate the final salience map, for example using a dynamic weighting procedure ensuring the contribution of each conspicuity map is never fixed but is instead dependent on the activity peaks in the signal.

Since the method of the invention requires a relatively low computational effort, embodiments of the present invention can perform this determination in real time using inexpensive hardware. Because real time processing is possible, the present invention can be applied to problems for which prior art approaches to determining salience are unsuited. For example, the present invention could be applied in autonomous vehicles or surveillance systems to assist in identifying objects requiring attention. In addition, the present invention can be applied during compression of images and/or video data to identify the more salient parts of the image which can then be encoded with higher fidelity, e.g. higher resolution or higher bitrate, than other, less-salient parts of the image.

Exemplary embodiments of the present invention will be described below with reference to the accompanying drawings, in which.

In the following description, like parts depicted in more than one figure are denoted by like reference numerals. In various Figures conspicuity and salience values are indicated on a color scale where blue indicates a low value and red indicates a high value in the conventional manner.

The present invention aims to predict visual attention for an average observer with a free viewing task by filtering input image into a number of low-level visual "feature channels" at the same spatial domain, for features of some or all of color, intensity, orientation and motion (found in visual cortex). The term "free viewing" refers to situations in which observers are viewing their world without a specific goal. The present invention is based on consideration of low-level mechanisms as well as the system-level computational architecture according to which human vision is organized.

A method according to an embodiment of the present invention is depicted at a high level in FIG. 1 and is explained further below. FIG. 2 depicts an apparatus according to an embodiment, for carrying out the method.

An apparatus according to an embodiment of the present invention comprises a client device 10 which includes a central processing unit 11 connected to a storage device 12, input device such as a keyboard 13 and a display 14. Images to be processed in the invention can be captured using a still camera 15 or a video camera 16, retrieved from the storage device 12 or obtained from another source, e.g. via the internet 20. The central processing unit 11 may include a graphic processing unit GPU in order to perform parallel calculations optimally.

The current apparatus can take the form of a portable device such as a smart phone or tablet whereby all of the elements—including an image capture device, display and touch panel input—are combined into a single compact housing. The outputs of the present invention may be stored in the storage device 12, displayed to the user, or transmitted to another computer. In an embodiment of the invention, some or all of the steps of the method can be carried out on a remote server 21 connected to the client computer 10 via a network 20, such as the internet.

Embodiments of the present invention aim to provide a determination of the salience of an image, for example in the form of a salience map. The salience (also called salience) of an item—be it an object, a person, a pixel, etc.—is the distinct subjective perceptual quality which makes some items in the observed world stand out from their background and immediately grab our attention. Embodiments of the present invention may utilize a numerical value to indicate salience which may be determined in absolute terms or relatively across one or more images.

In the description below, the term "sensory conspicuity features" or simply "conspicuity features", is used to refer to features or parts of an image which are conspicuous, e.g. by crossing a threshold on a relative or absolute scale of salience.

Figure 1:
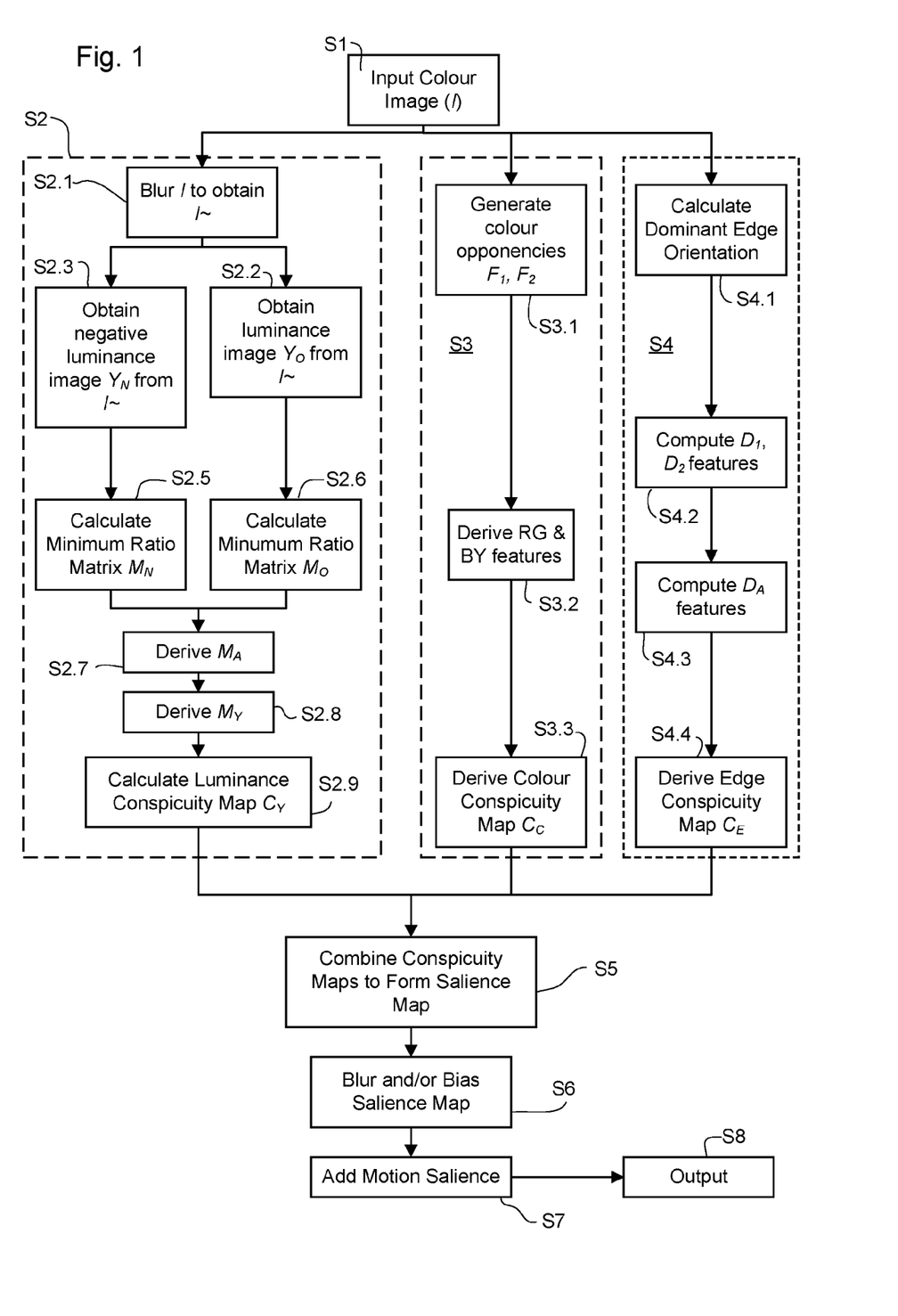
FIG. 1 is a diagram of an image processing method according to an embodiment of the present invention.
Figure 2:
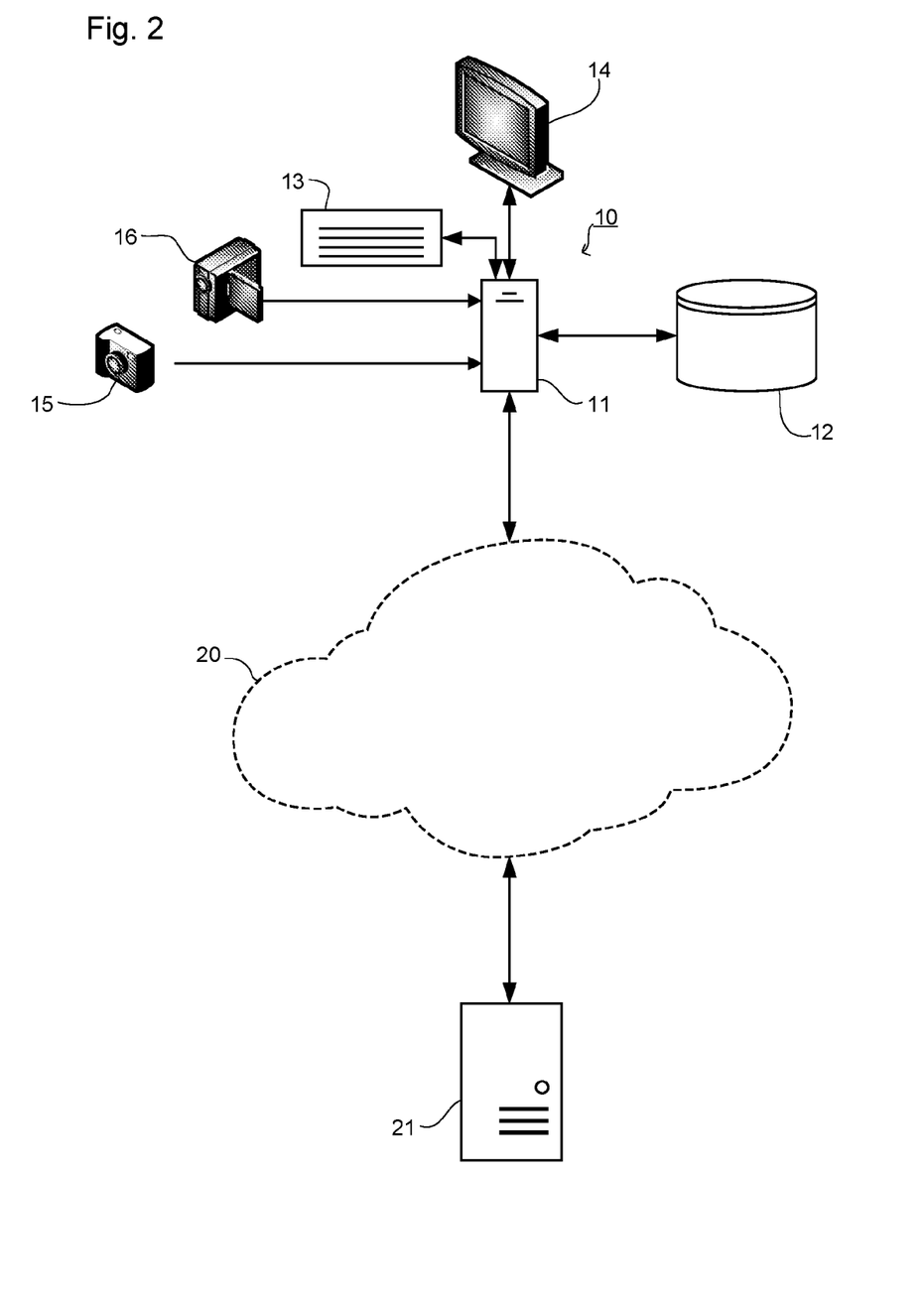
FIG. 2 is a diagram of an image processing apparatus according to an embodiment of the present invention.

As shown in FIG. 1, the present embodiment of the invention receives S1 an input color image I and performs respective processes S2, S3, S4 to obtain one or more conspicuity maps C based on one or more of luminance, color, and spatial frequency (including edges). In an embodiment, a monochrome image can also be used. The conspicuity maps C are combined S5 to form a salience map S. The salience map S can be enhanced by performing various enhancement steps, such as applying a blur S6, or including motion information S7. The final salience map is output S8, e.g. by displaying it or storing it in memory.

An algorithm S2 for generating a luminance conspicuity map is described first. In an embodiment of the invention, luminance contrast is the primary variable on which salience computation is based. It is also the first type of information extracted by human visual systems in the retina.

A computational model named Division of Gaussians (DoG) can be used for deriving a luminance conspicuity map in real-time. The DoG model is described further in Katramados, I., Breckon, T. P.: 'Real-time visual salience by Division of Gaussians', in 18th IEEE International Conference on Image Processing (ICIP), 2011, which document is hereby incorporated by reference in its entirety. The DoG model comprises three distinct steps to derive a visual salience map.

In the first step, a luminance image $U_1$ is derived from the input image I and used to generate a Gaussian pyramid U comprising n levels, starting with image $U_1$ as the base with resolution w×h. Higher pyramid levels are derived via down-sampling using a 5×5 Gaussian filter. The top pyramid level has a resolution of $(w/2^{n-1}) \times (h/2^{n-1})$. This image is referred to as $U_n$.

In the second step, $U_n$ is used as the top level of a second Gaussian pyramid D to derive its base $D_1$. In this case, lower pyramid levels are derived via up-sampling using a 5×5 Gaussian filter.

In the third step, an element-by-element division of $U_1$ and $D_1$ is performed to derive the minimum ratio matrix M of their corresponding values as described by:

$$M(i, j) = \min\left(\frac{D_1(i, j)}{U_1(i, j)}, \frac{U_1(i, j)}{D_1(i, j)}\right) \quad (1)$$

The luminance conspicuity map is then given by:

$$C(i,j) = 1 - M(i,j) \quad (2)$$

However, the present embodiment uses both the input image I and its negative I' which provides lower contrast but with a wider dynamic range. The present embodiment allows investigation of local features in a dual rail antagonistic structure, where the direct and inverse images are used to intrinsically derive a luminance conspicuity map. The method proposed comprises six steps to derive a visual salience map as detailed below.

Figure 3A:
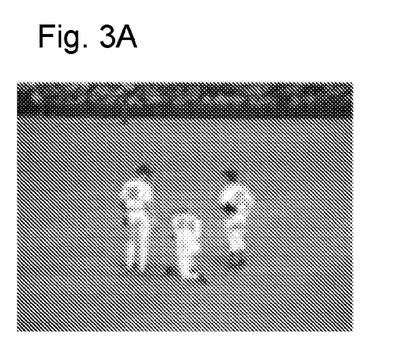
FIGS. 3A to 3D show an example input image and the effects of various processes applied to it.

First, the input image I is blurred S2.1, e.g. using a 7×7 Gaussian filter, to replicate the low-pass spatial filtering which occurs when the eye's optical system forms a retinal image. This step can be omitted if the resolution of the input image is low. Exemplary blurred positive and negative images are shown in FIG. 3A and 3C respectively.

Secondly, relative luminance, $Y_O$, and negative luminance, $Y_N$, of the RGB values of the blurred image I~ are calculated S2.2, S2.3 as:

$$Y_O = 0.5010 \times r + 0.4911 \times g + 0.0079 \times b \quad (3)$$

$$Y_N = 255 - Y_O \quad (4)$$

The weights of R, G and B channels were calculated according to the experimental display characteristics to fit V (λ), the CIE luminosity function of standard observer—objects that will be viewed at a distance—https://www.ecse.rpi.edu/~schubert/Light-Emitting-Diodes-dot-org/Sample-Chapter.pdf. Other weights may be appropriate in other circumstances.

Figure 3B:
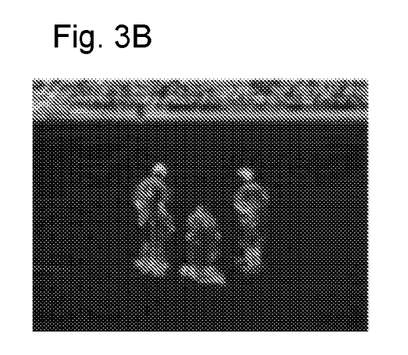
Figure 3C:
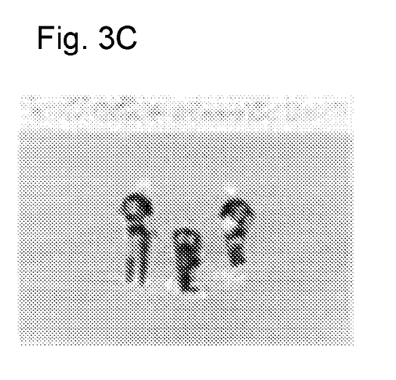
Figure 3D:
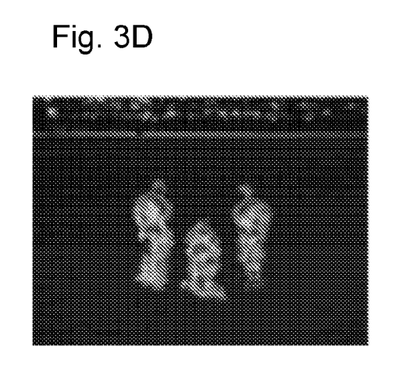

Thirdly, minimum ratio matrices are derived S2.5, S2.6 using the DoG approach as explained above for both blurred input image, $M_O$, and blurred negative image, $M_N$, as depicted in FIGS. 3B and 3D respectively.

Fourthly, an Aggregated Minimum Ratio Matrix $M_A$ is calculated S2.7 from $M_O$ and $M_N$ derived from Step 3 as:

$$M_A = (1-\lambda)M_O + \lambda M_N \quad (5)$$

where tuning parameter λ is derived by using intrinsic image measures from coefficient of variance, $$\frac{\sigma}{\mu},$$

of $M_O$ and $M_N$ as:

$$\lambda = \frac{\frac{\sigma}{\mu}(M_O)}{\frac{\sigma}{\mu}(M_O) + \frac{\sigma}{\mu}(M_N)} \quad (6)$$

Fifthly, a normalised Minimum Ratio Matrix $M_Y$ is derived S2.8 from $M_A$ and $\lambda$ derived from Step 3 and 4 as:

$$M_Y = \frac{M_A - M_{A_{min}}}{M_{A_{max}} - M_{A_{min}}} \quad (7)$$

Sixthly, a luminance conspicuity map $C_Y$ is derived S2.9 from (5) and (7) as:

$$C_Y(i,j) = 1 - M_Y(i,j) \quad (8)$$

Figure 4A:
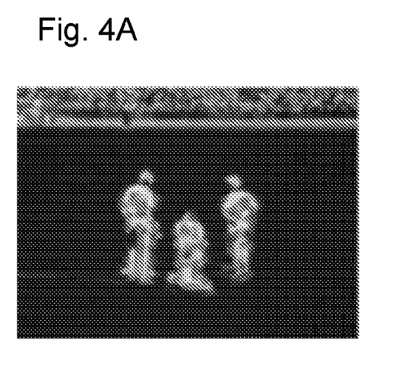
FIGS. 4A and 4B show a luminance conspicuity map generated according to the present invention and according to a prior method respectively.
Figure 4B:
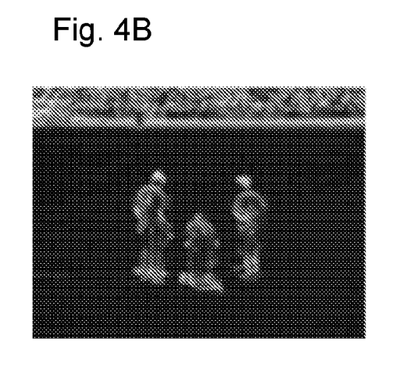
Figure 5A:
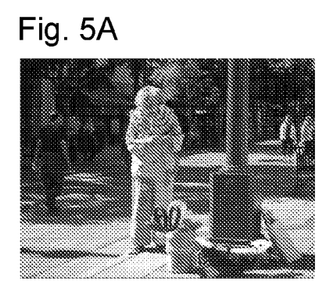
FIGS. 5A and 5B show an example image and a color conspicuity map derived therefrom respectively.
Figure 5B:
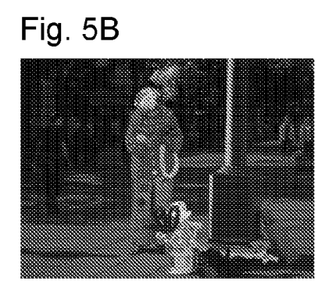
Figure 6A:
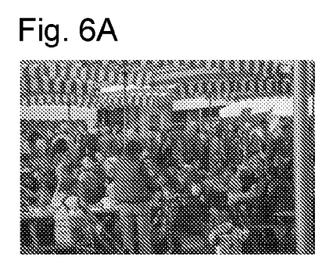
FIGS. 6A and 6B show another example image and a color conspicuity map derived therefrom.
Figure 6B:
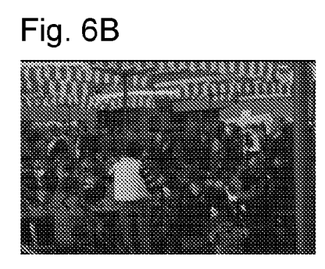

The luminance conspicuity map $C_Y$ for the example image is shown in FIG. 4A alongside the corresponding map generated by the DoG method, FIG. 4B, for comparison.

Next a method S3 for generating a color conspicuity map is described.

Color opponencies are central to modelling the contribution of color to salience. To this end, the RGB values of the color input image are mapped S3.1 onto red-green (RG) and blue-yellow (BY) opponency features in a way that largely eliminates the influence of brightness. The color conspicuity map can be computed as follows.

First, dual antagonistic color opponencies are computed as:

$$F_1 = \frac{r-g}{\max(r,g,b)}, F_2 = \frac{g-r}{\max(r,g,b)} \quad (9)$$

$$F_3 = \frac{b - \min(r,g)}{\max(r,g,b)}, F_4 = \frac{\min(r,g) - b}{\max(r,g,b)} \quad (10)$$

when the values of $F_1$, $F_2$, $F_3$ and $F_4$ are negative, these values are set to zero.

Secondly, RG and BY features are derived S3.2 from dual antagonistic color opponencies:

$$RG = (1-\alpha)F_1 + \alpha F_2, BY = (1-\beta)F_3 + \beta F_4 \quad (11)$$

$$\alpha = \frac{\frac{\sigma}{\mu}(F_1)}{\frac{\sigma}{\mu}(F_1) + \frac{\sigma}{\mu}(F_2)}, \beta = \frac{\frac{\sigma}{\mu}(F_3)}{\frac{\sigma}{\mu}(F_3) + \frac{\sigma}{\mu}(F_4)} \quad (12)$$

where tuning parameters $\alpha$ and $\beta$ are derived by using intrinsic image measures from coefficient of variance, $$\frac{\sigma}{\mu},$$

of dual antagonistic color opponencies. When the intensity value of a pixel in a scene image is very small, the color information of the pixel is hardly perceived. Thus, to avoid large fluctuations of the color opponency values at low luminance, RG and BY are set to zero at locations with $\max(r,g,b) < 1/10$ assuming a dynamic range of $[0,1]$.

Thirdly, the color conspicuity map, $C_C$, is derived S3.3 from (11) and (12) as:

$$C_C(i,j) = BY(i,j) + RG(i,j) \quad (13)$$

Examples of color conspicuity maps are shown in FIGS. 5A, 5B, 6A, 6B, where A shows the original image and B the resulting color conspicuity map.

Next an algorithm S4 for generating an edge (orientation) conspicuity map is described. Biological visual systems are highly adapted to the image statistics of the natural world. A particularly important aspect of the statistics of natural scenes is the arrangements of edges they contain. Edges are not arranged randomly, and the structure in their arrangements is important for shape recognition and texture discrimination. In an embodiment of the invention, an edge orientation conspicuity map is calculated as set out below:

First, Scharr gradient operators, e.g. of size 3×3, are used to calculate S4.1 the dominant edge orientation in the image, as below:

$$d_x = \begin{bmatrix} -3 & -10 & -3 \\ 0 & 0 & 0 \\ 3 & 10 & 3 \end{bmatrix}, d_y = \begin{bmatrix} -3 & 0 & 3 \\ -10 & 0 & 10 \\ -3 & 0 & 3 \end{bmatrix} \quad (14)$$

$$d_{xy} = \begin{bmatrix} -10 & -3 & -0 \\ -3 & 0 & 3 \\ 0 & 10 & 3 \end{bmatrix}, d_{yx} = \begin{bmatrix} 0 & -3 & -10 \\ 3 & 0 & -3 \\ 10 & 3 & 0 \end{bmatrix} \quad (15)$$

Secondly, $D_1$, $D_2$ and $D_A$ features are computed S4.2, S4.3 by convolving the intensity image, $Y_o$, with dual antagonistic edge orientation kernels.

$$D_1 = (1-\alpha)Y_O * d_x + \alpha Y_O * d_y, \quad D_2 = (1-\beta)Y_O * d_{xy} + \beta Y_O * d_{yx} \quad (16)$$

$$\alpha = \left(\frac{\frac{\sigma}{\mu}(Y_O * d_x)}{\frac{\sigma}{\mu}(Y_O * d_x) + \frac{\sigma}{\mu}(Y_O * d_y)}\right)^2 \quad \beta = \left(\frac{\frac{\sigma}{\mu}(Y_O * d_{xy})}{\frac{\sigma}{\mu}(Y_O * d_{xy}) + \frac{\sigma}{\mu}(Y_O * d_{yx})}\right)^2 \quad (17)$$

$$D_A = (1-\gamma)D_1 + \gamma D_2 \quad (18)$$

$$\gamma = \left(\frac{\frac{\sigma}{\mu}(D_1)}{\frac{\sigma}{\mu}(D_1) + \frac{\sigma}{\mu}(D_2)}\right)^2 \quad (19)$$

where tuning parameters $\alpha$, $\beta$ and $\gamma$ are derived by using intrinsic image measures from coefficient of variance, $$\frac{\sigma}{\mu},$$

of dual antagonistic edge orientations.

Thirdly, the edge orientation conspicuity map, $C_E$ is derived S4.4 by normalizing $D_A$.

$$C_E = \frac{D_A - D_{A_{min}}}{D_{A_{max}} - D_{A_{min}}} \quad (20)$$

Figure 7A:
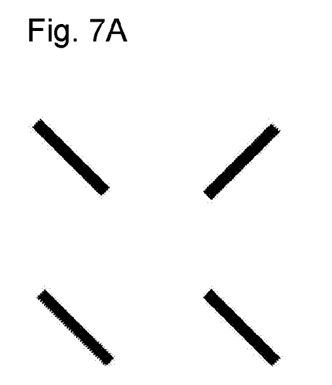
FIGS. 7A and 7B show an example image and an edge conspicuity map derived therefrom.
Figure 7B:
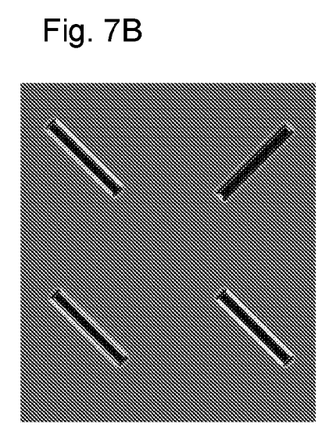
Figure 8A:
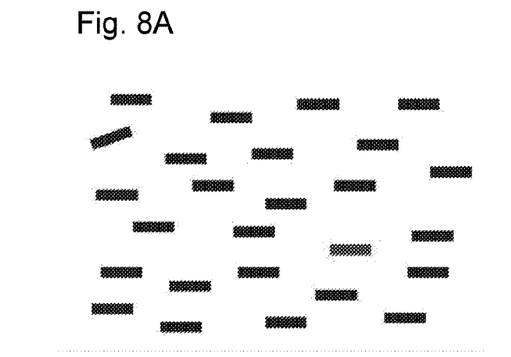
FIGS. 8A to 8F show an example input image, results of various processing steps carried out on it and a final salience map according to an embodiment of the invention.
Figure 8B:
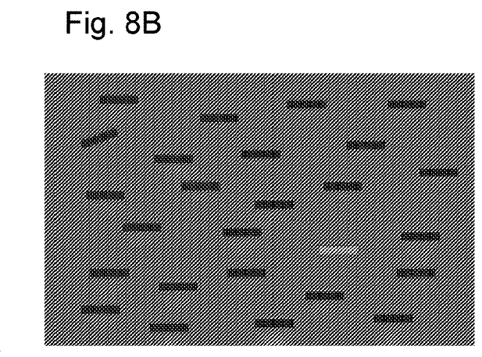
Figure 8C:
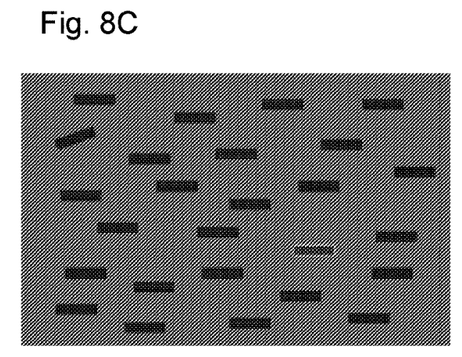
Figure 8D:
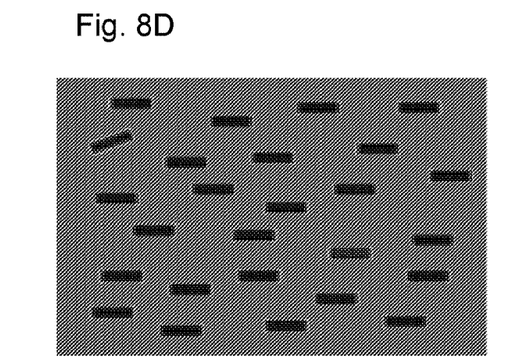
Figure 8E:
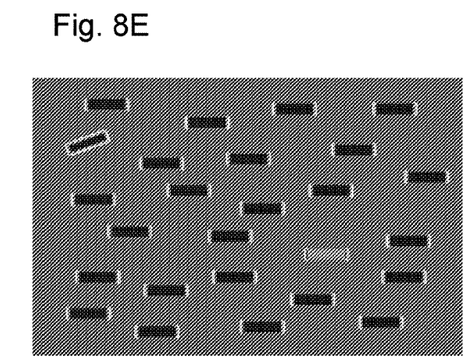
Figure 8F:
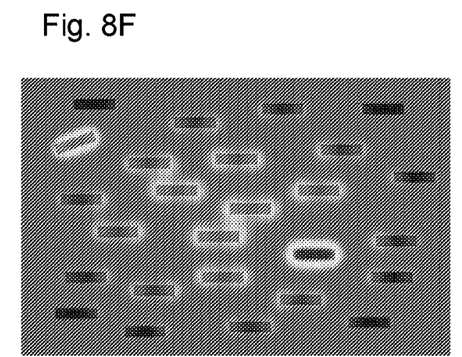

FIGS. 7A and 7B show an example input image and the resulting edge conspicuity map.

The salience map is then derived by combining one or more of the conspicuity maps. One difficulty in combining color, intensity and edge orientation conspicuity maps into a single scalar salience map is that these features represent a priori not comparable modalities, with different dynamic ranges and extraction mechanisms. An embodiment of the present invention therefore uses a dynamic weighting procedure by which the contribution of each conspicuity map is not fixed but is instead dependent on the activity peaks of conspicuity levels. A method of calculating a salience map from conspicuity maps is described below.

First, statistical data is computed from the selected conspicuity maps $$\phi_Y = \frac{\sigma}{\mu}(C_Y), \phi_C = \frac{\sigma}{\mu}(C_C), \phi_E = \frac{\sigma}{\mu}(C_E), \quad (21)$$

$$\hat{\phi}_Y = \mu(C_Y), \hat{\phi}_C = \mu(C_C), \hat{\phi}_E = \mu(C_E), \quad (22)$$

$$\sum = \phi_Y + \phi_C + \phi_E, \hat{\sum} = 2 \times (\hat{\phi}_Y + \hat{\phi}_C + \hat{\phi}_E) \quad (23)$$

Secondly, a salience map is calculated by dynamically weighting conspicuity maps $$S = \alpha C_C + \beta C_E + \gamma C_Y \quad (24)$$

where $$\alpha = \frac{\sum(\hat{\phi}_C + \hat{\phi}_E) + \hat{\sum}\phi_C}{2\sum\hat{\sum}}, \quad (25)$$

$$\hat{\beta} = \max\left(\frac{\hat{\phi}_C + \hat{\phi}_Y}{\sum}, \frac{\phi_E}{\sum - \phi_E}\right), \hat{\gamma} = \max\left(\frac{\hat{\phi}_C + \hat{\phi}_E}{\hat{\sum}}, \frac{\phi_Y}{\sum - \phi_C}\right)$$

$$\alpha = \frac{\hat{\alpha}}{\hat{\alpha} + \hat{\beta} + \hat{\gamma}}, \beta = \frac{\hat{\beta}}{\hat{\alpha} + \hat{\beta} + \hat{\gamma}}, \gamma = \frac{\hat{\gamma}}{\hat{\alpha} + \hat{\beta} + \hat{\gamma}} \quad (26)$$

FIGS. 8A to F depict an example input image, the various conspicuity maps and a resulting salience map.

Figure 9A:
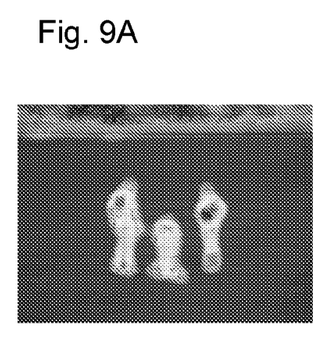
FIGS. 9A and 9B show the effects of different enhancement processes carried out in a salience map according to an embodiment of the present invention.
Figure 9B:
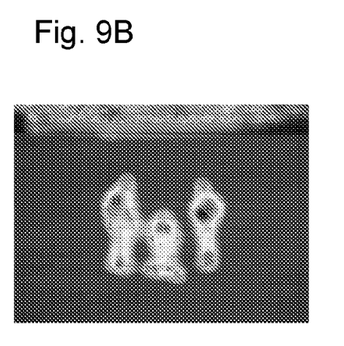

Various optional enhancements to the salience map calculated as described above can be made. For example, the salience maps can be blurred S5 and/or a bias towards the centre added to emulate foveal vision. In an embodiment a Gaussian Filter, G, (e.g. of size 15×15) is applied. In an embodiment a central bias map, $S_C$, e.g. with a Gaussian kernel of 7 with a weight 0.3 is also applied. FIGS. 9A and 9B show, using the example image from FIGS. 3 and 4, the effect of Gaussian filter G and the combination of the Gaussian filter G and central bias map $S_C$ respectively. The combined output is calculated as:

$$\hat{S} = 0.7 \times G*S + 0.3 \times S_C \quad (27)$$

In an embodiment of the invention, ultra-wide angle images, such as 360° images are processed. Such images can be obtained by stitching together images obtained using two or more wide angle imaging systems. When processing such images to determine salience no central bias is applied so that a field of view for closer examination can be selected after the event.

Another optional enhancement is to incorporate motion features. Temporal aspects of visual attention are relevant in dynamic and interactive setups such as movies and games or where an observer is moving relative to the observed scene. An embodiment of the invention uses the motion channel to capture human fixations drawn to moving stimuli (in the primate brain motion is derived by the neurons at MT and MST regions which are selective to direction of motion) by incorporating motion features between pairs of consecutive images in a dynamic stimuli to derive temporal salience, $S_T$, as follows:

Firstly, a difference image, DF, is computed from the current, $Y_O[n]$, and previous, $Y_O[n-1]$, images.

$$DF = |Y_O[n] - Y_O[n-1]| \quad (28)$$

Secondly, the difference image, DF, is blurred to remove detail and noise with a Gaussian Filter, G (e.g. of size 15×15)

$$\widehat{DF} = G*DF \quad (29)$$

Thirdly, motion salience, $S_M$, is calculated by applying a hard threshold to the blurred difference image calculated in Step 2.

$$S_M(i,j) = \begin{cases} \widehat{DF}(i,j) & \text{if } \widehat{DF}(i,j) > 20 \\ 0 & \text{else} \end{cases} \quad (30)$$

Fourthly, the motion salience, $S_M$, is added to spatial salience, $\hat{S}$, calculated in (27):

$$S_T = 0.3 \times G*S_M + 0.7 \times \hat{S} \quad (31)$$

Figure 10:
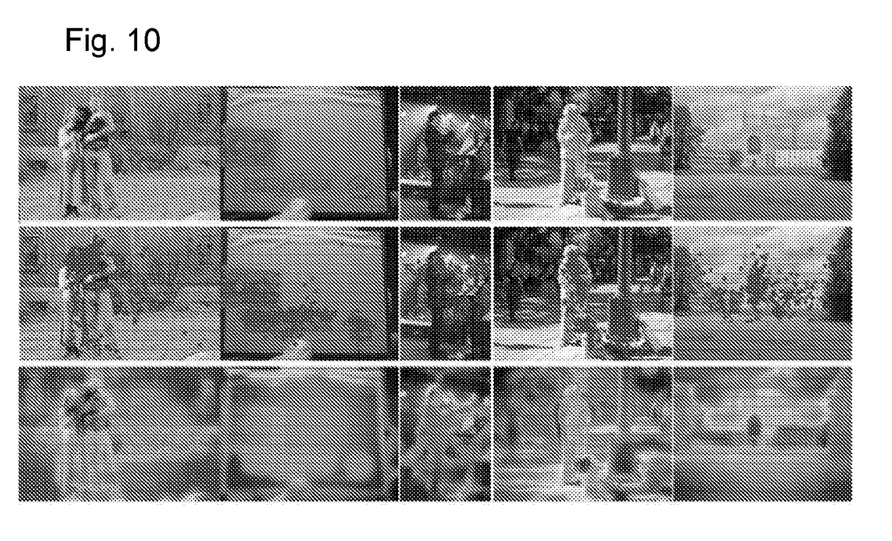
FIG. 10 shows various sample images together with visual salience indicated by eye tracking experiments and salience maps generated according to an embodiment of the present invention.

A performance analysis was performed on an MIT benchmark data set [Tilke Judd, Frodo Durand, and Antonio Torralba,: 'A Benchmark of Computational Models of Saliency to Predict Human Fixations', in Computer Science and Artificial Intelligence Laboratory Technical Report]. The present invention was found to provide a useful approximation of the visual salience reflected in the eye-tracking data. Results are shown in FIG. 10.

Because the computational effort required for the present invention is reasonable, it can be implemented on readily obtainable hardware and still provide a real-time salience map at a reasonable frame rate. Accordingly, an embodiment of the present invention provides a computer program that calculates in real-time a salience map for a screen display and overlays the salience map on the display in semi-transparent form. The screen display can be the output of another application, the GUI of an operating system, a pre-recorded moving image, or a feed from an imaging device. The overlay can be used for testing of user-interfaces of applications or operating systems, or for review of computer games and movies. The salience map generating program can be used in a portable computing device that includes an imaging device, e.g. a smartphone or tablet, to enable a live site survey of a building or other location. The present invention can also be applied in applications such as control of autonomous vehicles for identifying objects requiring attention.

The invention can also be applied to the compression of images, including video signals. In such an embodiment, the salience of different areas of the image, or of frames of the video signal, is determined and used to control the compression process. For example, regions of higher salience are compressed less or encoded with greater fidelity than regions of lower salience. The regions of higher salience may be encoded at a higher resolution, at a higher bitrate and/or at a higher frame rate or otherwise prioritized over areas with a lower salience. Different block sizes may be used for regions of higher salience. In this way the image or video signal can be encoded in a given size or bandwidth whilst achieving a subjectively better output.

Thus the present invention provides a novel algorithm for salience detection based on a dual rail antagonistic structure to predict where people look in images in a free-viewing condition. Furthermore, the proposed algorithm can be effectively applied to both still and moving images in visual media without any parameter tuning in real-time. An embodiment of the present invention comprises a computer program for carrying out the above described method. Such a computer program can be provided in the form of a standard alone application, an update or add-in to an existing application or an operating system function. Methods of the present invention can be embodied in a functional library which can be called by other applications.

It will be appreciated that the above description of exemplary embodiments is not limiting and that modifications and variations to the described embodiments can be made. For example, computational tasks may be performed by more than one computing device serially or concurrently. The invention can be implemented wholly in a client computer, on a server computer or a combination of client- and server-side processing. Certain steps of methods of the present invention involve parallel computations that are apt to be implemented on processers capable of parallel computation, for example GPUs. The present invention is not to be limited save by the appended claims.

The invention claimed is:

1. A method of processing an image to identify conspicuous regions thereof, the method comprising:
   receiving an input image;
   deriving first and second antagonistic images from the input image, wherein the first and second antagonistic images are derived from a) a luminance image and a negative luminance image, b) a pair of RG and BY color opponency images or c) a pair of images obtained by convolving the input image with dual antagonistic edge orientation kernels;
   calculating a weighted sum of the first and second antagonistic images; and
   deriving a conspicuity map from the weighted sum.

2. A method of processing an image to identify conspicuous regions thereof, the method comprising:
   receiving an input image;
   deriving first and second antagonistic images from the input image, wherein the first and second antagonistic images are derived from a luminance image and a negative luminance image;
   calculating a weighted sum of the first and second antagonistic images; and
   deriving a conspicuity map from the weighted sum;
   wherein deriving a conspicuity map comprises deriving aggregated minimum ratio matrices using a Division of Gaussians method.

3. A method according to claim 2 wherein obtaining a conspicuity map comprises performing a weighted sum of the minimum ratio matrices.

4. A method according to claim 1 wherein deriving first and second antagonistic images comprises blurring the input image.

5. A method according to claim 1 wherein a plurality of conspicuity maps are derived and further comprising obtaining a salience map from the conspicuity maps.

6. A method according to claim 5 wherein the conspicuity maps include at least one of: luminance conspicuity maps, color conspicuity maps and edge conspicuity maps.

7. A method according to claim 5 wherein obtaining a salience maps comprises calculating a weighted average of the conspicuity maps using weights dependent on peak values of the respective conspicuity maps.

8. A method according to claim 5 further comprising blurring and/or center-weighting the salience map.

9. A method according to claim 5 wherein the input image is one of a sequence of images and further comprising calculating a motion salience map based on the input image and one or more preceding images in the sequence of images; and combining the salience map with the motion salience map.

10. A method according to claim 1 further comprising displaying the conspicuity map or the salience map superimposed on the input image.

11. A method according to claim 10 further comprising capturing the input image using a camera and displaying the conspicuity map or the salience map superimposed on the input image substantially in real time.

12. A method of compressing an image or a sequence of images, the method comprising:
   identifying conspicuous regions of the image or sequence of images by:
      receiving an input image;
      deriving first and second antagonistic images from the input image, wherein the first and second antagonistic images are derived from a) a luminance image and a negative luminance image;
      calculating a weighted sum of the first and second antagonistic images; and
      deriving a conspicuity map from the weighted sum; and
   compressing conspicuous regions with greater fidelity than other regions of the image.

13. A computer program product comprising a non-transitory computer-readable medium storing computer interpretable code that, when executed on a computer system, instructs the computer system to perform a method according to claim 1.

14. An image processing apparatus comprising a processor and a memory, the memory storing a computer program according to claim 13.

15. An image processing apparatus according to claim 14 further comprising an image capture device configured to capture an image as the input image.

* * * * *